United States Patent
Cui et al.

(10) Patent No.: US 12,231,958 B2
(45) Date of Patent: Feb. 18, 2025

(54) ADAPTABLE RESILIENCY FOR A VIRTUALIZED RAN FRAMEWORK

(71) Applicant: AT&T INTELLECTUAL PROPERTY I, L.P., Atlanta, GA (US)

(72) Inventors: Zhi Cui, Sugar Hill, GA (US); Xiaowen Mang, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 338 days.

(21) Appl. No.: 17/939,793

(22) Filed: Sep. 7, 2022

(65) Prior Publication Data
US 2024/0080715 A1  Mar. 7, 2024

(51) Int. Cl.
*H04W 28/08* (2023.01)
*H04W 28/24* (2009.01)
*H04W 72/563* (2023.01)

(52) U.S. Cl.
CPC ....... *H04W 28/0967* (2020.05); *H04W 28/24* (2013.01); *H04W 72/563* (2023.01)

(58) Field of Classification Search
CPC ........... H04W 28/0967; H04W 72/563; H04W 28/24
See application file for complete search history.

(56) References Cited

U.S. PATENT DOCUMENTS

| | | | |
|---|---|---|---|
| 2017/0142206 A1* | 5/2017 | Kodaypak | H04L 12/1407 |
| 2018/0343567 A1* | 11/2018 | Ashrafi | H04L 43/20 |
| 2020/0296155 A1* | 9/2020 | McGrath | G06F 9/5027 |
| 2021/0014656 A1* | 1/2021 | Mueck | H04W 4/40 |

\* cited by examiner

*Primary Examiner* — Duc C Ho
(74) *Attorney, Agent, or Firm* — Guntin & Gust, PLC; Atanu Das

(57) ABSTRACT

Adaptable resiliency for a virtualized radio access network (vRAN) framework is disclosed. A resiliency management component can determine vRAN topological adaptations that can reflect resiliency requirements of service instance(s). Accordingly, sufficient redundant vRAN components to satisfy the resiliency requirements can be deployed. However, unlike conventional redundancy techniques that can determine a highest level of redundancy and then apply that relative to all supported services, the disclosed subject matter can avoid over-deploying redundant vRAN components, e.g., redundant components exceeding the resiliency requirement of a service instance, resulting in lowered monetary and non-monetary costs to maintain a vRAN. Moreover, as the services change, the topology of the vRAN can be automatically adapted to purge excessive redundancies, add newly required redundancies, etc., which can facilitate propagating an adequate but lean vRAN topology that is sufficiently resilient.

20 Claims, 10 Drawing Sheets

ADAPTABLE RESILIENCY FOR A VIRTUALIZED RAN FRAMEWORK

TECHNICAL FIELD

The disclosed subject matter relates to a virtualized radio access network (vRAN) and, more particularly, to adaptable resiliency for a vRAN.

BACKGROUND

Network virtualization and software defined networking (SDN) are important features of modern networks, e.g., a fifth generation (5G) network, a sixth generation (6G) network, etc., and can provide improved flexibility, programmability, time to market, etc. A radio access network (RAN) of a modern network can be decomposed such that some RAN function(s) can be centralized and virtualized, while other RAN function(s) can be decentralized and virtualized. As an example, a non-real time function, such as an L3 function, an L2 function, etc., of a control plane device, a user plane device, etc., can be centralized and virtualized functions(s), while a real time RAN function(s) can be distributed, e.g., proximate to or comprised in cellular components at or near an edge of a network, such as a virtual control plane (vCP) or virtual user plane (vUP) function performing at a distributed unit (DU), radio unit (RU), etc. The vRAN generally promotes an open RAN eco-system. A vRAN system preferably provides on par, or better, performance than a conventional physical RAN, with regard to reliability or another key performance indicator(s) (KPI). Typically, it is understood that improved reliability can be achieved at higher monetary and non-monetary cost. It is desirable that a resilient vRAN support the many different types of services, e.g., in 5G and beyond, and do so at more favorable monetary and non-monetary cost that are currently feasible with conventional techniques and technologies.

DETAILED DESCRIPTION

Figure 1:
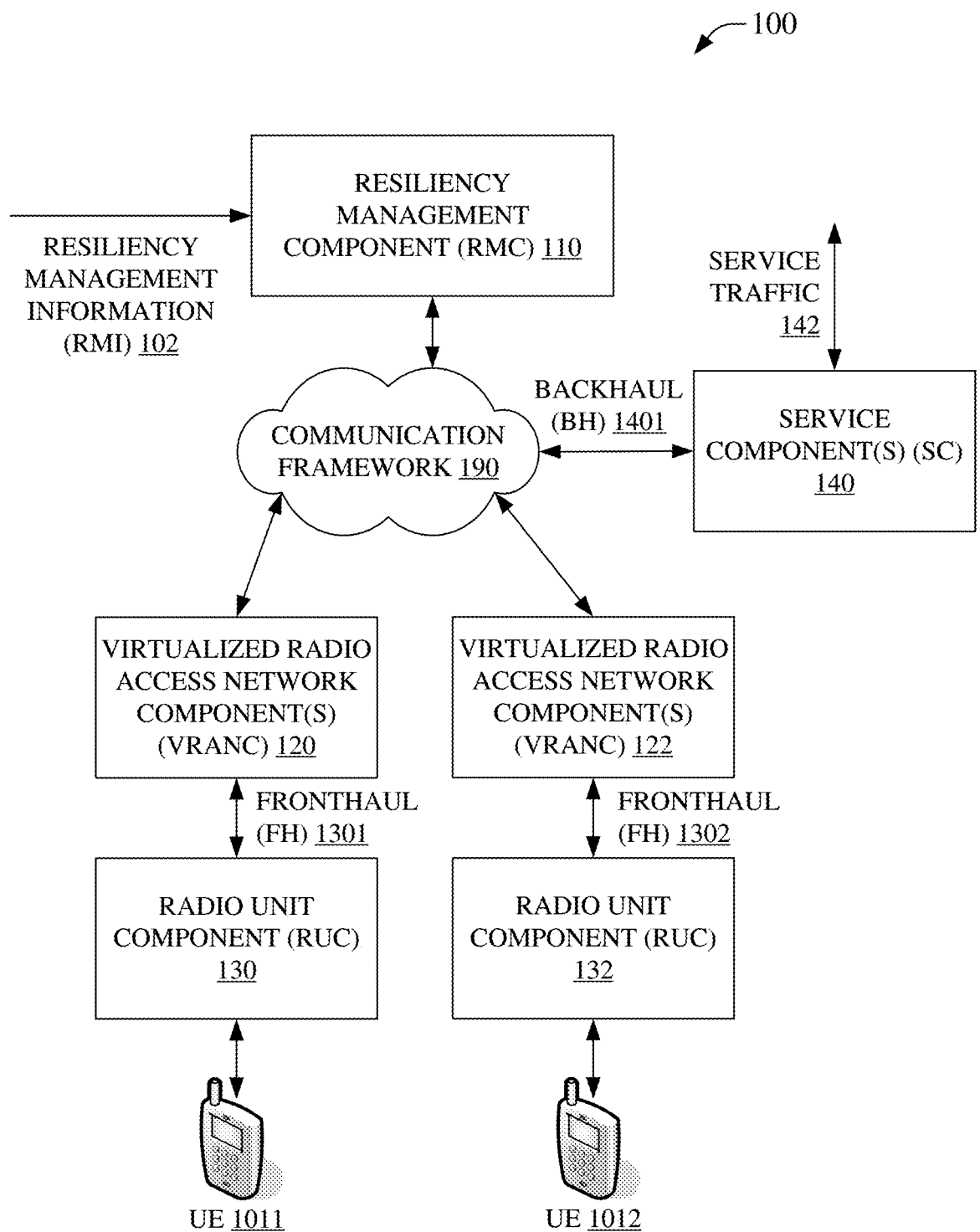
FIG. 1 is an illustration of an example system that can facilitate adapting resiliency for a virtualized radio access network, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As noted above, network virtualization and SDN can provide improved flexibility, programmability, time to market, etc., for a modern network(s). Decomposition of a RAN can comprise employing a virtual network function(s), wherein some virtual functions can be centralized and other virtualized function(s) can be decentralized. As an example, in a 5G wireless network environment, a gNB can be divided into two physical entities, e.g., a centralized unit (CU) and distributed unit (DU). The CU can enable support of some layers/sublayers of a protocol stack, typically higher layers such as service data adaption protocol (SDAP), packet data convergence protocol (PDCP), radio resource control (RRC), etc., while the DU can provide support for other layers/sublayers, typically lower layers such as radio link control (RLC), medium access control (MAC), the physical layer, etc. In practice, generally, there can be a single CU for each gNB, and that CU can then control multiple DUs, e.g., DUs typically far outnumber CUs and can often have a one-to-many relationship between a CU and corresponding DUs where a count of CUs is typically less than a count of DUs. Whereas a DU can typically support one or more cells of the example 5G wireless network, it can be appreciated that, in this example, one gNB can typically control hundreds of cells, an advantage over earlier wireless network generations. Additionally, a CU and DU can employ open standards to facilitate interoperability, e.g., a CU from vendor X can be operatable with a DU from vendor Y. Where improved reliability for a vRAN can typically be achieved at higher monetary and non-monetary cost, for example based on component location or location functionality, e.g., resiliency of a control plane (CP) function can be different than resiliency of a user plane (UP) function, resiliency of a CU can be different than resiliency of a DU, etc., it is typically desirable to reduce these cost(s) and enable a resilient vRAN that can support the many different types of services of a modern network while doing so at a more favorable monetary and non-monetary cost that is currently feasible with conventional techniques and technologies. In embodiments, resiliency can correspond to instantiating redundant vRAN component(s), however, different resiliency needs can be supported by different levels of redundancy, for example based on a service being supported, among vRAN components, e.g., a higher resiliency service can be associated with a higher level of vRAN component redundancy than for a lower resiliency service. In this regard, analysis of a service(s) employing a vRAN component(s) can be used in adapting resiliency of a vRAN, e.g., different services can have differing reliability requirements that can be reflected in a redundancy of vRAN components for a vRAN topology, e.g., facilitating adapting resiliency for a vRAN based on a corresponding service, e.g., a service, a service and a location, a service and a component function, a service and a location and a component function, etc.

An embodiment of the disclosed subject matter discloses a microservice, hereinafter a resiliency management component (RMC) or similar term, that can support adapting resiliency for disaggregated vRAN component(s), such as virtual control plane component (vCP), virtual user plane component (vUP), virtual CU (vCU), virtual DU (vDU), etc., that can be based on service-aware and automatically adapting redundancy of a vRAN component(s), adapting a vRAN topology, etc. In some embodiments, or manual adaptation can be implemented based on service analysis. Disaggregation of RAN operation(s), e.g., as a vRAN, etc., facilitates a RAN that can be implemented via scalable, adaptable, upgradable software functions instead of conventional proprietary network hardware that can typically be restrictive to adaptation. Generally, non-real time (non-RT) and near-real time (near-RT) events can be managed separately in a vRAN, such as where non-RT events, for example, event loops of one second or greater, can be managed within a service management and orchestration component/layer (SMO), typically functioning centrally, such as on a network entity core network component. In a vRAN, near-RT applications, such as an xApp(s), etc., can communicate with non-RT applications, such as rApp(s), etc., to perform a vRAN operation(s). An example xApp can typically be performed near a network edge to accommodate near-RT operations while an example rApp can be performed further from a network edge, e.g., at an SMO component, etc., to achieve non-RT operations, e.g., the example xApp can be deployed at a customer premises server while the example rApp can be deployed at a carrier core SMO component, etc. Other deployments are readily appreciated by one of skill in the relevant arts and all such deployments are within the scope of the instant disclosure even where not explicitly recited for the sake of clarity and brevity. For clarity and brevity in this application, near-rRT applications will be termed xApp(s), although other near-RT applications are within the scope of the disclosure, and non-RT applications will be termed rApp(s), also although other non-RT applications are within the scope of this disclosure.

In contrast to conventional resiliency design that can be based on just a function or sub-function of a CP, UP, DU, etc., the novel subject matter presented herein can base resiliency, at least in part, on a service, e.g., on a service in addition to any proposed function/subfunction of a disaggregated vRAN component, etc. In this regard, it is to be appreciated that resiliency design can be improved where a service is considered, e.g., different services can employ different resiliency implementations, based in part on correspondingly different requirements for reliability. As an example, enhanced mobile broadband (eMBB) service can have a different resiliency requirement than an ultra-reliable low latency communication (URLLC) service, etc. By tailoring resiliency to a function/subfunction and a service, proportionate reliability for different services can be achieved. In terms of the preceding example, an example URLLC service can be designed with high resiliency and an example eMBB service can be designed to have a moderate resiliency, resulting in reliability determined to be adequate for both the example URLLC and eMBB services without incurring an excessive cost to also implement the example eMBB service at a same high resiliency as the example URLLC service, e.g., where the eMBB service doesn't require as high a reliability as the URLLC service in this example, there can be cost savings by implementing lower resiliency for the eMBB than the URLLC services.

In an embodiment, a novel IRC component, for example implemented as an rApp, etc., can be deployed in a network, for example via a service management and orchestration component (SMO) of the network. The IRC component can facilitate an adaptive resiliency design, failover selection, etc., based on contemporaneous network information, service(s) information, etc. As an example, a failover server(s) can be selected based on a type of traffic, a server load condition, a temperature, a time of day (TOD), historical failure information, a performance metric value, etc. Moreover, geographically diverse resiliency can be supported, e.g., traffic can be redirected to alternate serving locations based on a traffic type, a load condition(s), a TOD, historical failure information, a transport parameter(s), a performance, a latency, a distance from a local site, etc. As an example, a natural disaster can trigger redirecting traffic to different alternate server(s) according to a resiliency design that considers a corresponding service, such as redirecting eMBB traffic to a first alternate server and URLLC traffic to a different second alternate server. Moreover, in some embodiments, supplementary information can indicate that similar services can be redirected differently. As an example, contracts with an entity, such as the federal emergency management agency (FEMA) can prioritize a FEMA service(s), such as by preempting a non-FEMA service(s), such that, in an emergency response situation, a FEMA eMBB service can be redirected to a first alternate DU component and a non-FEMA eMBB service can be redirected to a different second alternate DU component. In this example, the first alternate DU component can, for example, have better key performance indicator(s) (KPIs) than the second alternate DU component, which can result in the resilience of the example FEMA eMBB service being better than the example non-FEMA eMBB service during the example emergency response situation. Moreover, in a version of this example, the first alternate DU component can be at a different location than the second alternate DU component, which can provide improved resiliency via geographical diversity of alternate DU component(s). Further, similar to the above example, the first alternate DU component at a first different location can have better KPIs than the second alternate DU component at a second different location, enabling network entity compliance with the example FEMA agreement in this example.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate adapting resiliency for a virtualized radio access network (vRAN), in accordance with aspects of the subject disclosure. System 100 can comprise resiliency management component (RMC). RMC 110 can enable adapting a topology of virtual components of a vRAN, e.g., adding or removing an instance(s) of a virtual control plane component (vCP), virtual user plane component (vUP), virtual CU (vCU), virtual DU (vDU), etc., adapting failover operations between vCPs, vUPs, vCUs, vDUs, etc., or other adaptations of or between virtual components of a vRAN. In embodiments, RMC 110 can enable adaptation of a topology of physical components enabling a vRAN, e.g., adding, removing, etc., physical network components supporting an instance(s) of a vCP, vUP, vCU, vDU, etc., for example, adding a server supporting operation of an additional vDU, etc. RMC 110 can receive resiliency management information (RMI) 102, which can comprise information germane to adapting resiliency of a vRAN(s). As an example, RMI 102 can comprise a rule(s) related to ranking, sorting, selecting, etc., a topology of vRAN components enabling adapting a resiliency of the vRAN(s). RMC 110 can receive service information from service component(s) (SC) 140, which can support a service(s) for UEs, e.g., UE 1011, UE 1012, etc., via service traffic 142. In embodiments supported services, via service traffic 142, can comprise telecommunication services, internet services, metaverse services, non-metaverse services, or other services, which can be enabled by transporting information via backhaul (BH) 1401, etc., communications framework 190, etc., fronthaul (FH) 1301, 1302, etc., or other transport paths between a service instance and a UE, e.g., UE 1011, 1012, etc.

Embodiments of system 100 can base adapting resiliency of a vRAN on analysis of a service(s) being supported by the vRAN. In this regard, RMC 110 can determine an adaptation of a vRAN by analysis of a service(s) supported by SC 140. As an example, a first service can be a voice over internet protocol (VoIP) service for a government entity and have a higher resiliency demand than a second VoIP service for another entity. In this example, RMC 110 can determine that a first vDU corresponding to the first service have a second local redundant vDU instance and a third remotely located redundant vDU instance implemented, such that if the first vDU underperforms, the first service can switch to the second vDU or the third vDU to maintain operation of the first service. In this example, switching to the second local vDU can avoid additional transport time associated with switching to the third remote vDU, however, where the first and second example vDU can both be affected by a local condition, switching to the third remotely located vDU can enable maintaining operation of the first service despite a local condition affecting both the first and second example vDU. This example redundancy can provide resiliency against underperformance of the first vDU and/or the second vDU, but 'costs' insanitation of the second and third vDUs. In contrast to the first service, the second example service, having a lower resiliency demand than the first service, can result in RMC 110 determining a different redundancy topology for corresponding components of the example vRAN. In this regard, for example, a fourth vDU of the second service can have a single redundant fifth vDU located remotely from the fourth vDU instance. Accordingly, in this example, where the fourth vDU is underperforming, the vRAN can switch the second service to the fifth remotely located vDU. This can increase data transport time for inclusion of a the remotely located fifth vDU as a substitute for the underperforming fourth vDU. However, the 'costs' of hardening the second service, e.g., providing resiliency for the second service via the vRAN, is implementing just the fifth vDU. As such, even though the function(s) of the first and second VoIP services are the same or similar, the resiliency of the vRAN for these services can be distinct based on RMC 110 determining that the first service has a higher resiliency demand than the second service. This determination can therefore support different topologies of the vRAN for the correspondingly different resiliency demands of the two example services. In contrast to treating the two example services the same or similarly based on their being the same or similar function(s), e.g., both are VoIP functions, treating them differently based on service analysis can reduce the 'costs' of providing appropriate resiliency in the vRAN. In the above example, if both example VoIP services are treated the same as the first service, then the cost would be instantiating two locally redundant vDUs and two remotely redundant vDUs, which is a greater 'cost' than the one locally redundant vDU and two remotely redundant vDUs implemented in the above example. Moreover, if both example VoIP services are treated the same as the second service, then the cost would be instantiating two remotely redundant vDUs, however the higher resiliency demand of the first service would be unmet by this vRAN topology. Accordingly, in the above example, RMC 110 adapting resiliency based at least in part on service analysis can provide for reduced 'costs', e.g., fewer redundant vDU instances in this example, than redundancies determined on functions, and can still meet resiliency requirements corresponding to one or more service(s).

RMC 110 can cause implementation of a vRAN topology(ies), via communication framework 190, where a vRAN can comprise one or more vRAN components, e.g., VRANC 120, 122, etc., which can be communicatively coupled to one or more UEs, e.g., UE 1011, 1012, etc., via one or more edge network components, e.g., radio unit component (RUC) 130, 132, etc. In this regard, UE 101, for example, can communicate with a service entity component, e.g., via service traffic 142, based on a communication path comprising RUC 130, FH 1301, VRANC 120, communication framework 190, BH 1401, SC 140, etc., wherein RMC 110 can support adapting this communication path by designating redundancy of a vRAN component(s). As an example, RMC 110 can designate VRANC 120 and VRAN 122 as redundant for voice services, such that where VRANC 120 fails, RUC 130 can switch connection from VRANC 120 to VRANC 122 to enable UE 1011 to maintain access to voice services previously supported via VRANC 120, e.g., the path for UE 1011 can be UE 1011_RUC 130_VRANC 120_communication network 190_SC 140 and RMC 110 can determine that a failover path can be UE 1011_RUC 130_VRANC 122 communication network 190_SC 140 or UE 1011_RUC 132_VRANC 122 communication network 190_SC 140. It is noted that, in this example, another service(s) of UE 1011 can have a different failover path determined by RMC 110, e.g., a metaverse service for UE 1011 can correspond to a different level of resiliency and can have a different failover path, or even no failover path, for the example metaverse service for UE 1011.

Example system 100 can illustrate RMC 110 enhancing rudimentary vRAN component redundancy conventionally employed in modern network systems. Reliability can be understood to comprise a trade-off between cost and a level of reliability/availability, e.g., improving resiliency of a vRAN can be associated with increased monetary and non-monetary costs, e.g., more instances of vRAN components can consume more computing resources, more power, cause more heat, increase complexity of a network implementing a vRAN, etc. Conventionally, network service provider and equipment vendor redundancy solutions are not granular to the service(s) level, e.g., do not consider resiliency requirements of different services, even where the services are of the same functional type. In this regard, convention resiliency can be viewed as being function based, e.g., a control plane function and a user plane function can have different redundancy design, a more centralized component can have a higher redundancy than distributed components, etc., which is distinct from basing resiliency on a service(s). It is noted that service-based resiliency can also consider function, location, etc., when determining adaption of a topology of a vRAN. Furthermore, conventional physical RAN redundancy is generally static because it can be difficult, expensive, etc., to change the physical topology of a RAN, which constraint is generally not relevant to vRANs which can have much lower barriers to adapting a vRAN topology, e.g., instantiating additional vDUs can be much less difficult or expensive than altering physical components of a conventional RAN. In this regard, conventional resiliency for vRANs leans toward a brute force high level of redundancy, e.g., all vRAN components can be regarded as having a resilience requirement that is the same as the most demanding function such that no vRAN component has less that the most demanding level of resiliency. This can be wasteful of 'costs' where some vRAN components of a vRAN function can have different resiliency requirements for different services of that vRAN function. Accordingly, the disclosed subject matter supports service-based resiliency design/adaptation for a vRAN to provide more granularly redundant component instantiations that can reduce 'costs' in comparison to conventional resiliency implementations for a vRAN. Moreover, where a modern network supports a wide spectrum of services, for example, eMBB service for internet-like services, etc. to URLLC service, such as remote surgery, autonomous cars, etc., where the eMBB and URLLC can have different resiliency requirements, adapting network topology can be based on a service(s). In this regard, conventionally, a function of a vRAN can apply the same resiliency for each service instance of the function. However, the disclosed subject matter applying service(s) analysis can support correspondingly applying different resiliency to each service instance of the function. This can facilitate automatic service(s)-based adaptation of a vRAN topology, e.g., as service instances supported by a function(s) of a vRAN change over time, RMC 110 can automatically adapt the topology of the vRAN in response to the changing composition of services in the vRAN, e.g., near-real-time (NRT) automatic redundancy, failover selection, etc., based on the real-time (RT) condition of a network, service composition, supplementary information, etc., can significantly improve network resiliency at a lower monetary and/or non-monetary cost that conventional techniques.

In embodiments, RMC 110 can determine one or more vRAN topologies, e.g., virtual component instances and interconnectivity for a vRAN, based on analysis of supported service instances, e.g., via information corresponding to SC 140 and/or service traffic 142, etc., RMI 102, etc. In embodiments, RMI 102 can comprise information such as traffic type, server load condition, network load condition, temperature, time of day, historical failure information, server performance, network performance, latency, logical and/or physical distance between components, etc. Some embodiments of example system 100 can rank these one or more determined vRAN topologies, for example, according to one or more ranking rules. As an example, a first ranking rule can rank a first topology meeting more resiliency requirements higher than a second topology meeting less resiliency requirements. As another example, a second ranking rule can increment a rank of a first topology meeting resiliency requirements at a more favorable 'cost' than a second topology meeting the resiliency requirements. As a further example, a third rule can demote and/or exclude a vRAN topology that does not satisfy a resiliency requirement that, for example, can be indicated in RMI 102. RMC 110 can further select a vRAN topology, for example, based on a ranking of the vRAN topology relative to another vRAN topology(ies). RMC 110 can automatically communicate information, e.g., resiliency control information 503, etc., that can facilitate implementation of a selected vRAN topology, which can result in automatically adapting a vRAN topology and correspondingly automatically adapting a resiliency for the vRAN relative to instances of services being supported by the vRAN. RMC 110 can continuously function to update vRAN resiliency, e.g., by monitoring RMI 102, service traffic 142, etc., updating rankings, and generating resiliency control information, e.g., resiliency control information 503, etc., to update a vRAN topology in accord with resiliency demands of service(s) in an efficient and automated manner.

Figure 2:
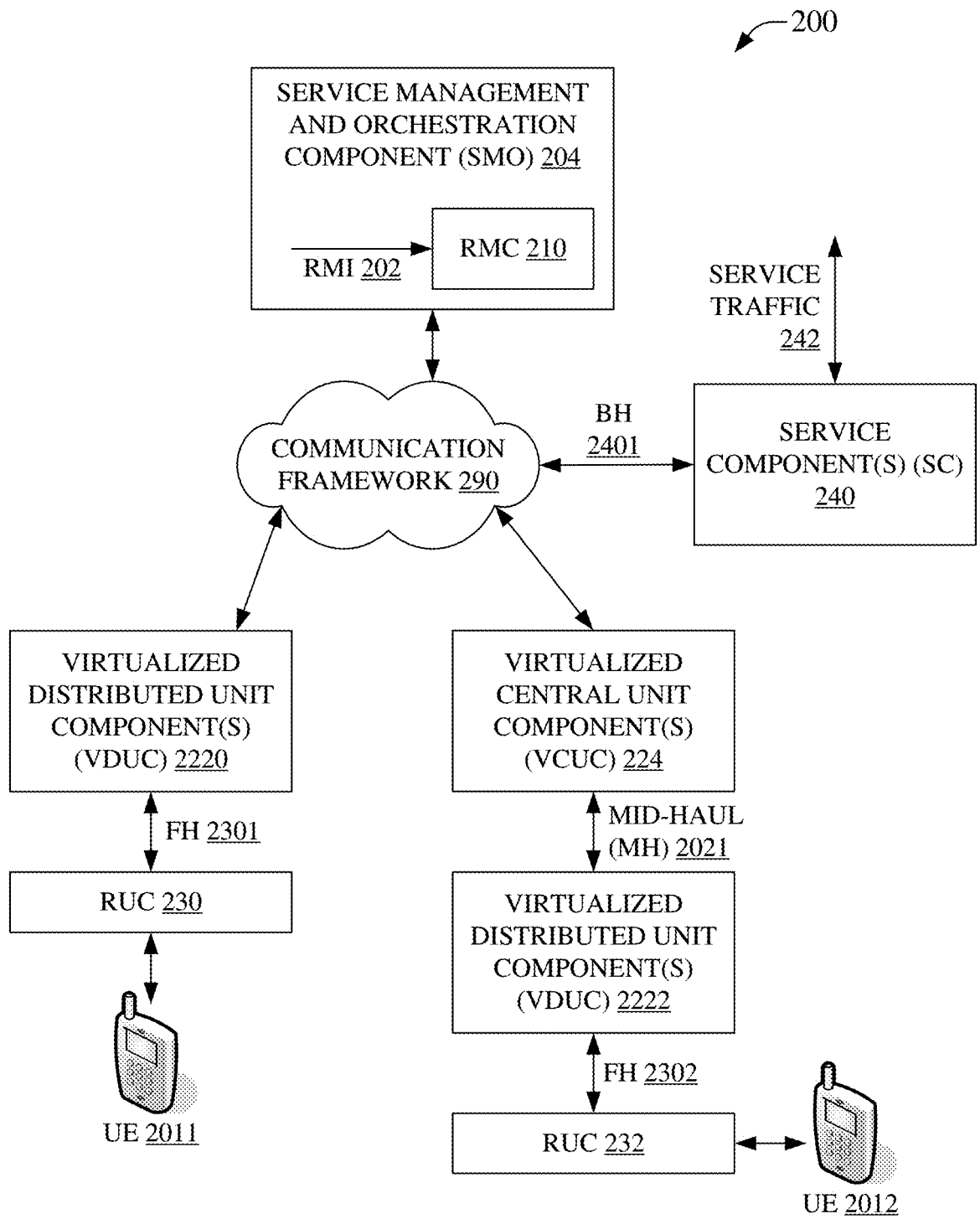
FIG. 2 is an illustration of an example system that can facilitate adapting resiliency for a virtualized radio access network via a service management and orchestration component, in accordance with aspects of the subject disclosure.

FIG. 2 is an illustration of a system 200, which can enable adapting resiliency for a virtualized radio access network (vRAN) via a service management and orchestration component (SMO), in accordance with aspects of the subject disclosure. System 200 can comprise SMO 204 that can comprise RMC 210. RMC 210 can receive RMI 202 that can be the same as, or similar to, RMC 102. RMC 210 can receive information corresponding to service traffic 242 traversing SC 240. In an embodiment, an analysis of service traffic 242 can be received by RMC 210 via BH 2401, communication framework 290, and SMO 204. Accordingly, RMC 210 can determine adapting resiliency of a vRAN(s) based, at least in part, on a service(s) supported by a vRAN(s) that can comprise a VRANC(s), such as virtual DU component (VDUC) 2220, VDUC 2222, virtual CU component (VCUC) 224, RUC 230, RUC 232, etc. A vRAN can support communication between a UE and a service via service traffic 242, e.g., UE 2011 can be communicatively coupled to a service via RUC 230, FH 2301, VDUC 2220, communication framework 290, BH 2401, SC 240, and service traffic 242. Similarly, for example, UE 2012 can be communicatively coupled to a service via RUC 232, FH 2302, VDUC 2222, mid-haul (MH) 2021, VCUC 224, communication framework 290, BH 2401, SC 240, and service traffic 242.

In example system 200, RMC 210 can be embodied in a novel microservice operating on a processor, such as an rApp. SMO 204 can comprise an interface(s) to a service, for example, a metaverse service(s), a non-metaverse service(s), etc., which can provide resiliency requirements for service(s) to RMC 210. This can, for example, support informing/configuring a relevant rApp(s) comprising RMC 210 to determine a topology of a vRAN that can support the corresponding service and service resiliency requirements. Moreover, embodiments of SMO 204 can subscribe to service(s) from relevant external sources, e.g., federal emergency management act (FEMA) service, national highway commission (NHC) service, etc., via RMI 202, etc., to assist RMC 210 in determining adapting resiliency for a vRAN. Further, in embodiments, SMP 204 can collect network conditions/performance metrics, for example, SMO 204 can use a standard 01 interface to collect network data, such as network load, alarm(s), performance metrics, etc., which can be comprised in RMI 202 and accordingly can be accessed by RMC 210. In embodiments, an rApp(s) of SMO 204, for example, can be in communication with an xApp(s) located closer to a network edge than the rApp(s), e.g., VCUC 224 can comprise an xApp in communication with RMC 210, e.g., where RMC 210 can be embodied in an rApp of SMO 204, and, for example, the example xApp can provide RT, or NRT, network performance information to RMC 210, e.g., comprised in RMI 202, which can aid RMC 210 in determining a vRAN topology considerate of contemporaneous a network performance condition.

Figure 3:
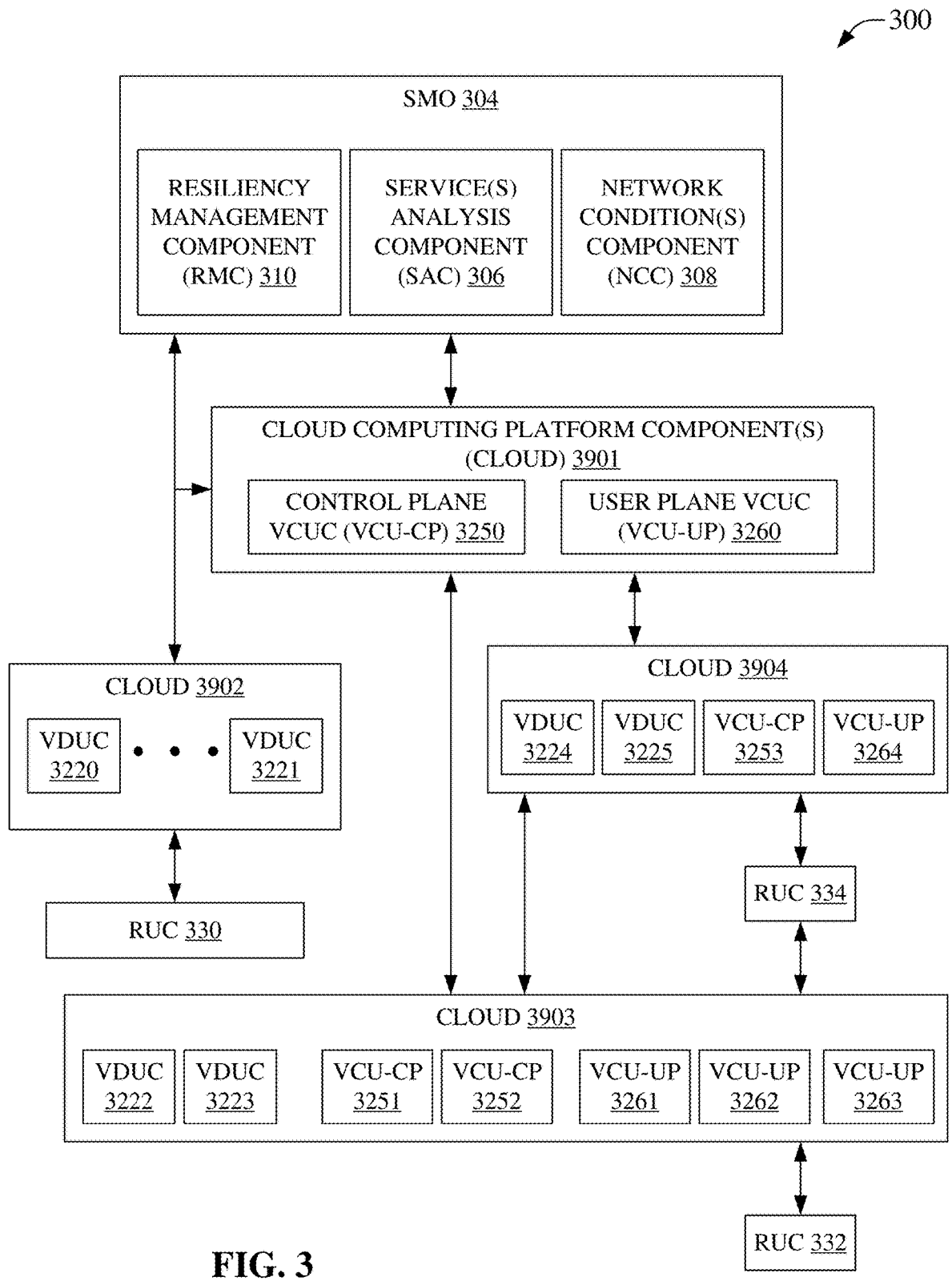
FIG. 3 is an illustration of an example system that can enable adapting resiliency for a virtualized radio access network based on an analysis of a service(s) via a service management and orchestration component, in accordance with aspects of the subject disclosure.

FIG. 3 is an illustration of a system 300, which can facilitate adapting resiliency for a virtualized radio access network (vRAN) based on an analysis of a service(s) via a service management and orchestration component (SMO), in accordance with aspects of the subject disclosure. System 300 can comprise SMO 304 that can comprise RMC 310. RMC 310 can receive RMI that can be the same as, or similar to, RMC 102. RMC 310 can receive information corresponding to a service(s) supported by a vRAN. Service(s) analysis component (SAC) 306 of SMO 304 can perform analysis of a service supported by a vRAN and can enable RMC 310 to determine adapting resiliency of a vRAN based, at least in part, on the service supported by the vRAN. In example system 300, a vRAN can comprise a VRANC, such as VDUC 3220 to VDUC 3225, etc.; a VCUC, such as VCU-CP 3250 to 3253, etc., a VCUC, such as VCU-UP 3260 to 3264, etc.; a RUC, such as RUC 330, RUC 332, RUC 334, etc.; or other virtual and/or physical components enabling the example vRAN. A vRAN can support communication between a UE and a service, for example, via network paths similar to, or the same as, illustrated in example systems 100, 200, etc.

In example system 300, network condition(s) component (NCC) 308 can determine information corresponding to network conditions, e.g., xApps can report RT and/or NRT network conditions to NCC 308, for example embodied in an rApp at SMO 304, that can then determine network condition information that can be accessed by RMC 310 to facilitate determining an adaptation of a topology of the vRAN effecting an adapting of resiliency for the vRAN that is based on a service, a network condition, and other information relevant to vRAN resiliency.

In an embodiment of the disclosed subject matter, a vRAN can comprise one or more cloud computing platform component (CLOUD), e.g., CLOUD 3901 to 3904, etc. In this regard, CLOUD(s) can interact to enable one or more a vRAN. IN example system 300, CLOUD 3902 can support RUC 330, etc., via VDUC 3220-3221, etc. Similarly, CLOUD 3903 can support RUC 332, 334, etc., via VDUC 3222-3223, etc., and CLOUD 3904 can support RUC 334, etc., via VDUC 3224-3225, etc. In an example embodiment, CLOUD 3902 can employ VCUC(s) VCU-CP 3250 and VCU-UP 3260 of CLOUD 3901. As illustrated, CLOUD 3903 can comprise VCU-CPs 3251-3252, etc., and VCU-UPs 3261-3263, etc., and CLOUD 3904 can comprise VCU-CP 3253, etc., and VCU-UP 3264, etc. In embodiments, CLOUD 3903 can also employ VCU-CP 3250 and/or VCU-UP 3260 of CLOUD 3901, VCU-CP 3253 and/or VCU-UP 3264 of CLOUD 3904, etc. Similarly, in embodiments, CLOUD 3904 can also employ VCU-CP 3250 and/or VCU-UP 3260 of CLOUD 3901, VCU-CPs 3251-3252 and/or VCU-UPs 3261-3263 of CLOUD 3903, etc. Additionally, in embodiments, CLOUD 3901 can also employ VCU-CPs 3251-3252, etc., and VCU-UPs 3261-3263, etc., of CLOUD 3903, VCU-CP 3253 and/or VCU-UP 3264 of CLOUD 3904, etc.

In this regard, a vRAN can be viewed as being greatly more flexible, relative to cost and/or complexity of changing a topology, in the instantiation of central components and/or distributed components than a conventional physical RAN. As an example, a customer premises equipment can operate CLOUD 3902 and RUC 330, such as a large corporate entity operating a private wireless network on their corporate campus that can be supported by a wireless carrier network. In this example CLOUD 3902 can employ VCU-CP 3250 and VCU-UP 3260 in support of operating the example private wireless network, e.g., CLOUD 3901 can be comprised in the example wireless carrier network and can support the portion of the example private corporate network implemented on CLOUD 3902, wherein VDUC 3220 to 3221, etc., can be regarded as distributed virtual components implemented at the corporate entity premises. In an aspect, VDUC 3221 can be redundant of VDUC 3220, such that if VDUC 3220 fails, RUC 330 can be switched to VDUC 3221 to maintain operations of the example private network. In a variation of this example, VDUC 3220 can have an additional redundancy, for example, embodied in VDUC 3222, etc., that can be located external to the example customer premises equipment, e.g., at CLOUD 3903, such that where VDUC 3220 and VDUC 3221 both are not functioning, RUC 330 can be switched to VDUC 3222 of CLOUD 3902 via CLOUD 3901. It is considered that CLOUD 3902 and 3903, in this example, can be in different locations, for example, different cabinets at the customer premises, at different premises of the customer, at different customer premises, in different cities, states, countries, etc. In this regard, different locations can experience different conditions and resiliency can reflect geographical diversity. In an example, CLOUD 392 can be in Seattle, Washington, and CLOUD 3903 can be in Portland, Oregon, such that a power failure in Seattle is unlikely to affect equipment in Portland. Accordingly, a power failure in Seattle can compromise performance of VDUCs 3220 to 3221, etc., and failover to VDUC 3222 in Portland can be an effective remedy.

In another example of example system 300, VDUCs 3220 and 3224 can be redundant to VDUC 3222, whereby failure of VDUC 3220 fails over to VDUC 3222 and failure of VDUC 3224 also fails over to VDUC 3222. In this regard, CLOUD 3902 and CLOUD 3904 can be geographically separated such that an event proximate to CLOUD 3902 is unlikely to affect CLOUD 3904, and similarly, an event proximate to CLOUD 3904 is unlikely to affect CLOUD 3902. In this example, it can be deemed sufficiently unlikely that both VDUC 3220 and 3224 will fail contemporaneously, allowing VDUC 3222 to be instantiated as a redundant VDUC for both VDUC 3220 and 3224. This can reduce a count of redundant VDUCs via geographic diversity.

In another example embodiment, CLOUD 3902 can employ VCU-CP 3250 and VCU-UP 3260 that can be redundantly supported by VCU-CP 3251 and VCU-UP 3263. Additionally, CLOUD 3904 can employ VCU-CP 3253 and VCU-UP 3264 that can be redundantly supported by VCU-CP 3250 and VCU-UP 3262. In this example, failure of VCU-CP 3250 can result in failing over to VCU-CP 3251 for CLOUD 3902 and loss of a redundant instance for CLOUD 3904. In response, NCC 308 can determine that a corresponding network condition has resulted in VCU-CP 3253 not having a redundant instance, e.g., as VCU-CO 3250 has failed, and can inform RMC 310 that can then determine a resolution adapting network resiliency, for example, by causing VCU-CP 3253 to have redundancy via VCU-CP 3252 of CLOUD 3903. Additionally, in this example, VCU-CP 3250 subsequently recovering can cause RMC 310 to revert to the prior topology, e.g., VCU-CP 3253 can return to protection via VCU-CP 3250. Numerous other examples of resilient vRAN topologies can be readily appreciated from example system 300, all of which are to be considered in the scope of the instant disclosure, even where not explicitly recited for the sake of clarity and brevity.

Figure 4:
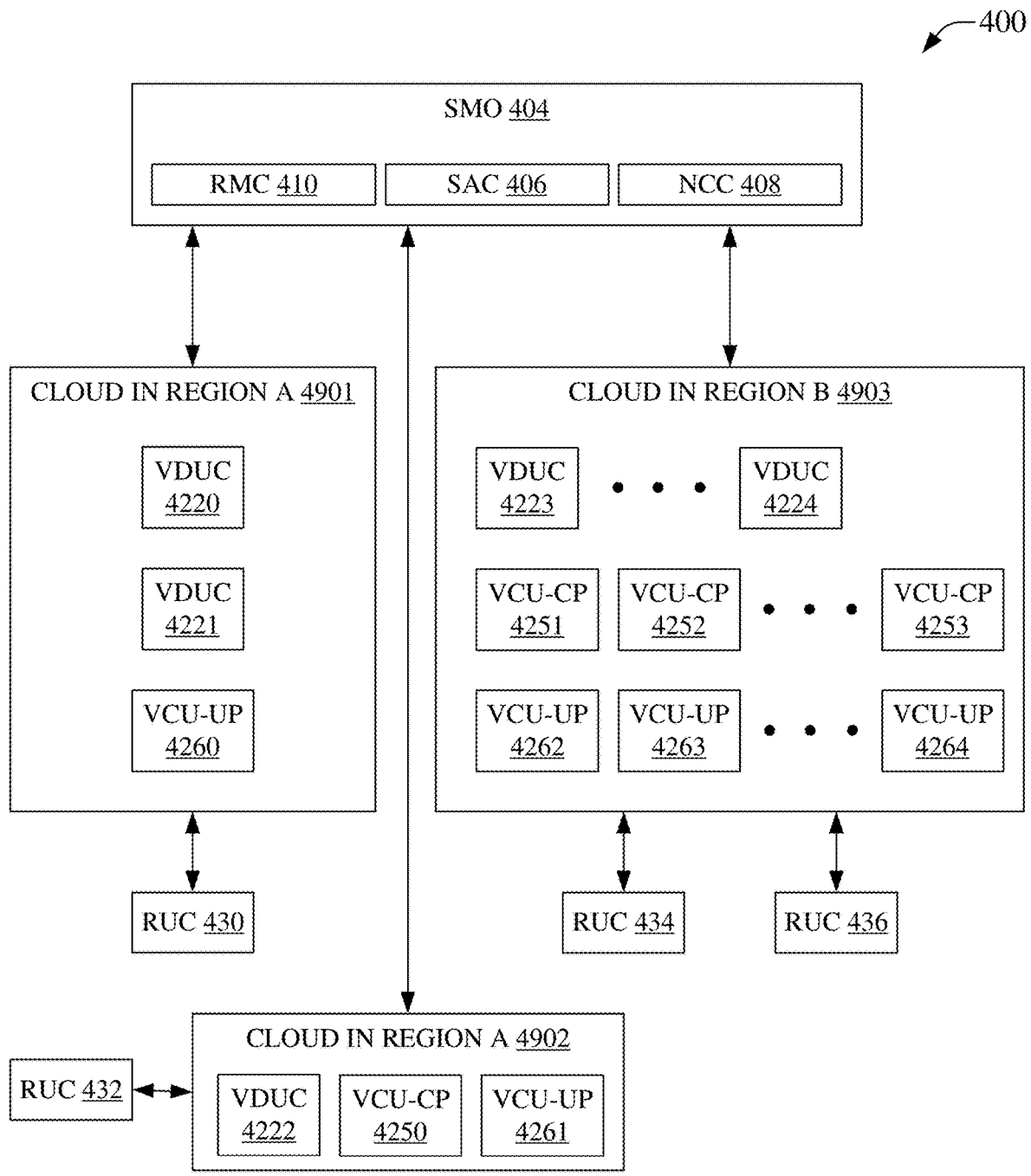
FIG. 4 illustrates an example system that can facilitate geographically diverse adapting of resiliency for a virtualized radio access network, in accordance with aspects of the subject disclosure.

FIG. 4 is an illustration of a system 400, which can enable geographically diverse adapting of resiliency for a virtualized radio access network (vRAN), in accordance with aspects of the subject disclosure. System 400 can comprise SMO 404 that can comprise RMC 410, SAC 406, NCC 408, etc. RMC 410 can receive RMI that can be the same as, or similar to, RMC 102. RMC 410 can receive information corresponding to a service(s) supported by a vRAN. SAC 406 of SMO 404 can perform analysis of a service supported by a vRAN and can enable RMC 410 to determine adapting resiliency of a vRAN based, at least in part, on the service supported by the vRAN. NCC 408 can determine information corresponding to network conditions, e.g., xApps can report RT and/or NRT network conditions to NCC 408, for example embodied in an rApp at SMO 404, that can then determine network condition information that can be accessed by RMC 410 to facilitate determining an adaptation of a topology of the vRAN effecting an adapting of resiliency for the vRAN that is based on a service, a network condition, and other information relevant to vRAN resiliency.

In an embodiment of the disclosed subject matter, a vRAN of system 400 can comprise one or more cloud computing platform component (CLOUD), e.g., CLOUD in region A 4901, CLOUD in region A 4902, CLOUD in region B 4903, etc. As illustrated, in example system 400, CLOUD in region A (CLOUD A) 4901 can comprise a VRANC, such as VDUC 4220, VDUC 4221, etc., a VCUC, such as VCU-UP 4260, etc., among other VRANCs. Similarly, CLOUD in region A (CLOUD A) 4902, for example, can comprise VDUC 4222, VCU-CP 4250, VCU-UP 4261, etc., and CLOUD in region B (CLOUD B) 4903 can comprise VDUCs 4223 to 4224, etc., VCU-CPs 4251 to 4253, etc., VCU-Ups 4262 to 4264, etc., among other VRANCs. CLOUD A 4901 can support RUC 430, CLOUD A 4902 can support RUC 432, CLOUD B can support RUC 434-436, etc. In an embodying, for example, where region A comprises both CLOUD A 4901 and CLOUD A 4902, the VRANCs of these CLOUDs can correspond to redundant instances in another region to provide geographic diversity, e.g., via VRANC instances of CLOUD B 4903. Accordingly, an event in region A that causes a local VRANC problems can failover to a VRANC instance in another geographic region. As an example, where VDUC 4220 fails, RUC 430 can instead use VDUC 4223, etc. In another example, VCU-UP 4260 and VCU-UP 4261 can both correspond to VCU-CP 4250, which can be redundantly supported up by VCU-CP 4252, etc. In an embodiment, CLOUD A 4901 can fail, whereby RUC 430 can locally failover to CLOUD A 4902. Moreover, redundant instances in CLOUD B 4903 can be relied on during the failover from CLOUD A 4901 to CLOUD A 4902, e.g., RUC 430 can correspond to VDUC 4221 and VCU-UP 4260 that can fail in this example, and can cause failover, for example, to VCU-CP 4250, VDUC 4224, and VCU-UP 4264. Additionally, new instances of VRANCs can be generated in CLOUD A 4902, such that support of RUC 430 can be transferred entirely back to CLOUD A 4902, and adapting resilience of the vRAN after failure of CLOUD A 4901 can include mapping such new VRANC instances to redundant VRANC instances in CLOUD B 4903. As noted elsewhere herein, this redundancy can be granularly based on a service(s) and corresponding resiliency requirement of the service(s) for RUC 430. In another example embodiment, a regional event can cause both CLOUD A 4901 and 4902 to fail, whereby redundant VRANC instances at CLOUD B 4903 can be substituted to support RUC 430, RUC 432, etc.

In a further example embodiment, VDUC 4221 can be affiliated with a favored entity that can request local resiliency and remote resiliency. Accordingly, VDUC 4221 can be backed up by VDUC 4222 local to region A and to VDUC 4223 located remotely in region B. In this example, VDUC 4220 can have a lower resiliency requirement than VDUC 4221, resulting in RMC 410 designating VDUC 4220 as being backed up by VDUC 4224 in region B. In response to a loss of CLOUD A 4901, in this example, VDUC 4221 can fail over to either VDUC 4222 or VDUC 4223, while VDUC 4220 can fail over to VDUC 4224. This can result in VDUC 4222 providing better performance for local UEs than VDUC 4224 due to less distance between the UE and the corresponding VDUC at remotely located region B. This can demonstrate that less 'cost' can be expended to provide resiliency based on resiliency requirements of a service, e.g., the service of the favored entity can have better resiliency, including local resiliency in this example, than the service for the non-favored entity. Accordingly, the resiliency of the service for the favored entity can be more robust and more flexible than for the other service in this example. Numerous other examples of resilient vRAN topologies can be readily appreciated from example system 400, all of which are to be considered in the scope of the instant disclosure, even where not explicitly recited for the sake of clarity and brevity.

Figure 5:
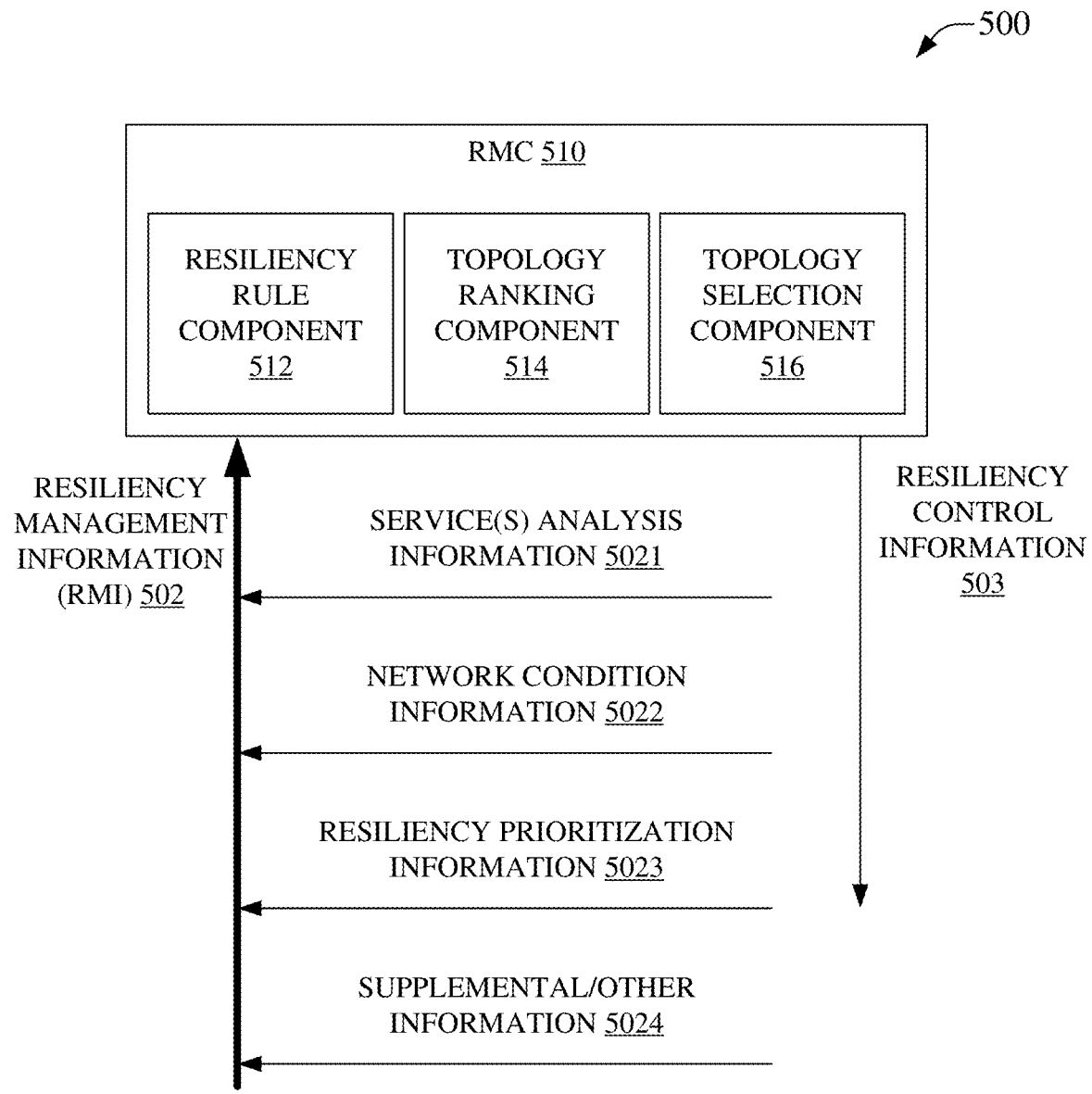
FIG. 5 illustrates an example system that can employ topology selection to facilitate adapting resiliency for a virtualized radio access network, in accordance with aspects of the subject disclosure.

FIG. 5 is an illustration of a system 500, which can support topology selection to facilitate adapting resiliency for a virtualized radio access network (vRAN), in accordance with aspects of the subject disclosure. System 500 can comprise RMC 510 that can determine adapting resiliency of a vRAN based, at least in part, on the service supported by the vRAN. RMC 510 can comprise resiliency rule component 512 that can determine that a rule related to resiliency has been satisfied. In embodiments, resiliency rule component 512 can receive one or more rules and can apply that rule(s) to determining that a determined topology of a vRAN satisfies a resiliency rule. In some embodiments, a level of satisfaction of a resiliency rule can be determined, e.g., a degree to which the resiliency rule has been satisfied. In this regard, a determined vRAN topology can be determined, e.g., by resiliency rule component 512, to fully satisfy a resiliency rule, partially satisfy a resiliency rule, or not satisfy a resiliency rule. As an example, a resiliency rule can relate to a first service that can correspond to having a resiliency requirement that includes a local first redundant VRANC and a second redundant VRANC that is not local, e.g., is remotely located. In this example, a vRAN topology that provides for a local redundancy but not a remote redundancy can be determined to partially satisfy a corresponding resiliency rule. In another example, a resiliency rule can relate to a first service having at least two remotely located redundant VRANCs, such that a topology providing for only one remotely located redundant VRANC can be determined to partially satisfy the corresponding resiliency rule.

RMC 510 can comprise topology ranking component 514 that can rank, order, filter, etc., vRAN topologies based on a level of satisfying one or more rules, e.g., via resiliency rule component 512. As an example, a topology that satisfies all rules can be higher ranked than a topology that only partially satisfies one or more rule, which can be higher ranked than a topology that does not satisfy any rule. Moreover, ranking via topology ranking component 514 can include ranking, sorting, filtering, etc., based on monetary and/or non-monetary costs of a corresponding topology. As an example, a topology that uses fewer computing resources to reach a same level of resiliency can be ranked higher than another topology that uses more computing resources. Additionally, ranking via topology ranking component 514 can include ranking, sorting, filtering, etc., based on a complexity of a corresponding topology. As an example, a more complex topology can be ranked lower than a less complex topology, all else being equal. As such, topology ranking component 514 can rank, sort, filter, etc., possible vRAN topologies relative to rule satisfaction, e.g., via resiliency rule component 512, costs, complexity, etc.

Topology selection component 516, of RMC 510, can enable selection of vRAN topology based, at least in part, a ranking of vRAN topologies. As an example, a highest ranked topology of a group of ranked topologies can be selected. As another example, a highest ranked topology can be excluded based on other criteria, for example contractual agreements, historical performance, ownership of physical resources, etc., whereby a next highest ranked topology can instead be selected via topology selection component 516.

RMC 510 can receive RMI 502. RMI 502 can comprise one or more of service(s) analysis information 5021, network condition information 5022, resiliency prioritization information 5023, supplemental/other information 5024, etc. In an embodiment, service(s) analysis information 5021 can comprise information related to previously analyzed service(s), information enabling RMC 510 to analyze a service(s), etc. In this regard, service(s) analysis information 5021 can support determining adapting resiliency for a vRAN based on granular service(s), as compared to conventionally basing redundant VRANCs on just function(s), location(s), etc., or combinations thereof. As such, the disclosed subject matter can employ service(s) analysis information 5021 to apply different resiliency to different services even where these different services are of a same function and/or same location. In embodiments, network condition information 5022 can relate to performance, e.g., latency, jitter, bandwidth, reliability, network/physical distance, or nearly any other information about a condition of a network corresponding to a vRAN. In an example, a topology that is slower than another topology, all else being equal, can be lower ranked by resiliency rule component 512 based on the slower speed indicated in the example network condition information 5022. Resiliency prioritization information 5023 can indicate higher and/or lower priority vRAN topologies. As an example, a contractual agreement with FEMA can correspond to resiliency prioritization information 5023 indicating that topologies satisfying FEMA service resiliency is more favored than another otherwise equivalent topology. This example resiliency prioritization information 5023 can be employed, for example, by resiliency rule component 512 to facilitate demining satisfaction of a corresponding rule, by topology ranking component 514 to increment/decrement a ranking of a vRAN topology, by topology selection component 516 to impact selection of a topology despite a ranking of the topology. As an example, a topology providing for prioritization of FEMA service(s), can be determined to satisfy a rule, via resiliency rule cop 512, where the rule is selected based on resiliency prioritization information 5023 indicating application of the rule, can have an increased ranking via topology ranking component 514 based on resiliency prioritization information 5023 indicating favorable ranking of FEMA prioritization topologies, can facilitate selection of a lower ranked FEMA prioritization topology by topology selection component 516, based on resiliency prioritization information 5023, where other higher ranked topologies do not prioritize FEMA service(s) in their corresponding topologies. Supplemental/other information 5024 can be included in RMI 502. As an example, supplemental/other information 5024 can indicate a group of physical network resources that can be considered for use in a VRAN topology, which group can be all, some, or none of the physical network resources otherwise available for use in a vRAN topology. As another example, supplemental/other information 5024 can indicate vRAN services that should not be included, should be included, etc., in a vRAN topology, for example, to exclude replication of a vRAN service that has a very high cost, such as a memory leak, etc. In this example, excluding resiliency for the high cost vRAN service can allow the service to run without redundancy.

RMC 510 can generate resiliency control information 503 based on operations related to RMI 502. As such, resiliency control information 503 can reflect a selected topology to employ in adapting resiliency for a vRAN. Accordingly, resiliency control information 503 can be used to update a topology of a vRAN, whereby the updated topology can adapt the resiliency of the vRAN based, at least in part, on granular service(s). Additionally, resiliency control information 503 can reflect other outlined information comprised in RMI 502 and ingested by RMC 510.

Figure 6:
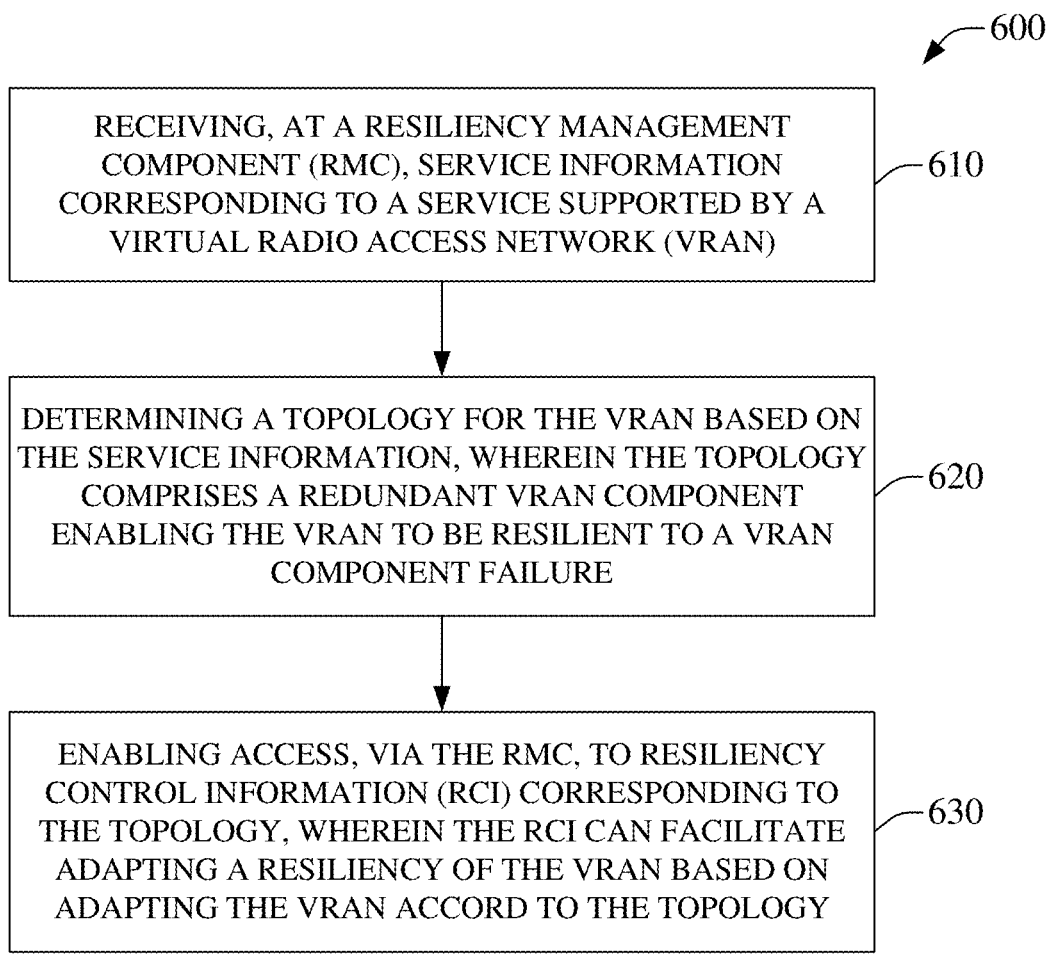
FIG. 6 is an illustration of an example system enabling adapting resiliency for a virtualized radio access network, in accordance with aspects of the subject disclosure.
Figure 7:
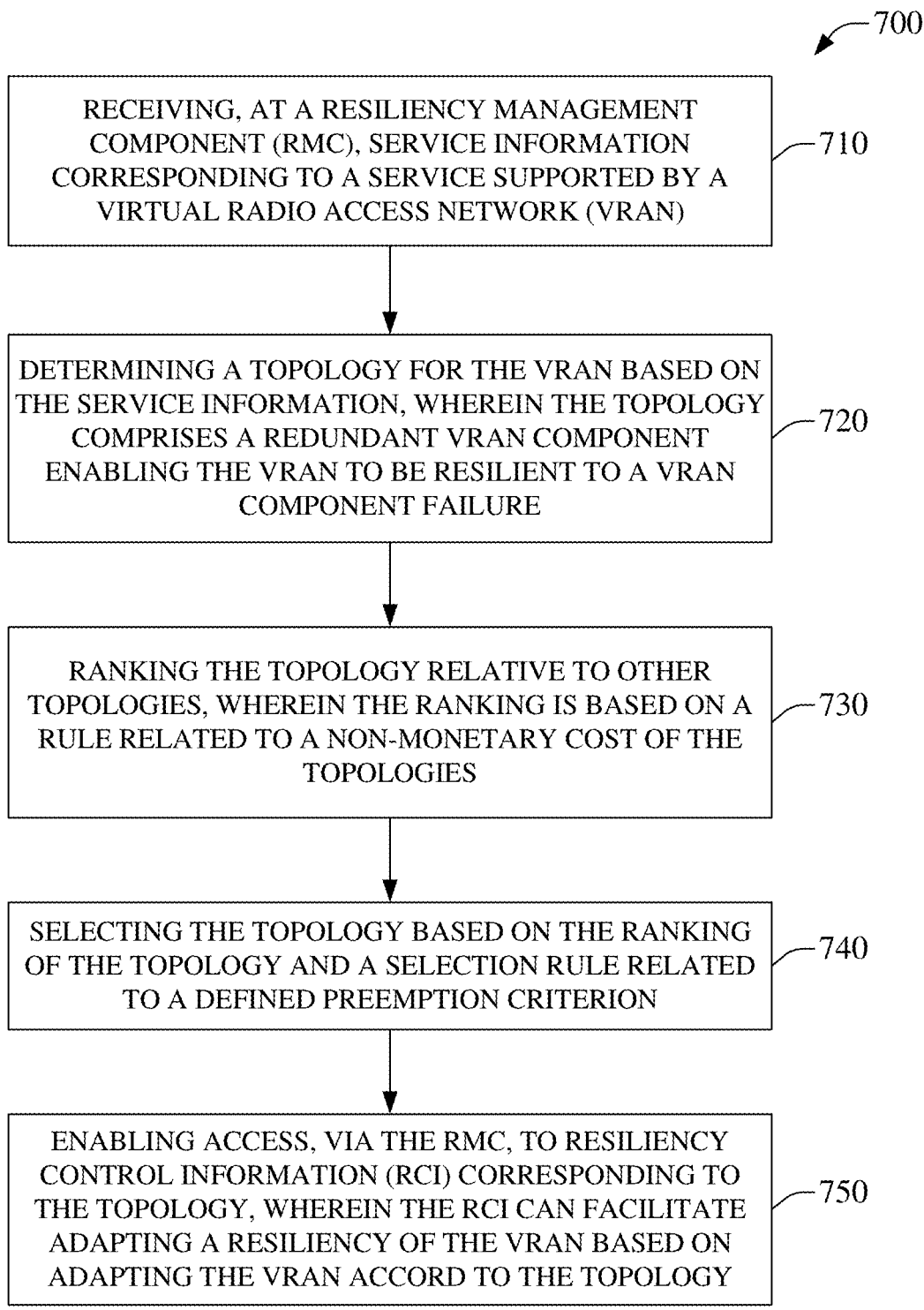
FIG. 7 illustrates an example method, enabling, via a resiliency rule, topology ranking, and topology selection, adapting resiliency for a virtualized radio access network, in accordance with aspects of the subject disclosure.
Figure 8:
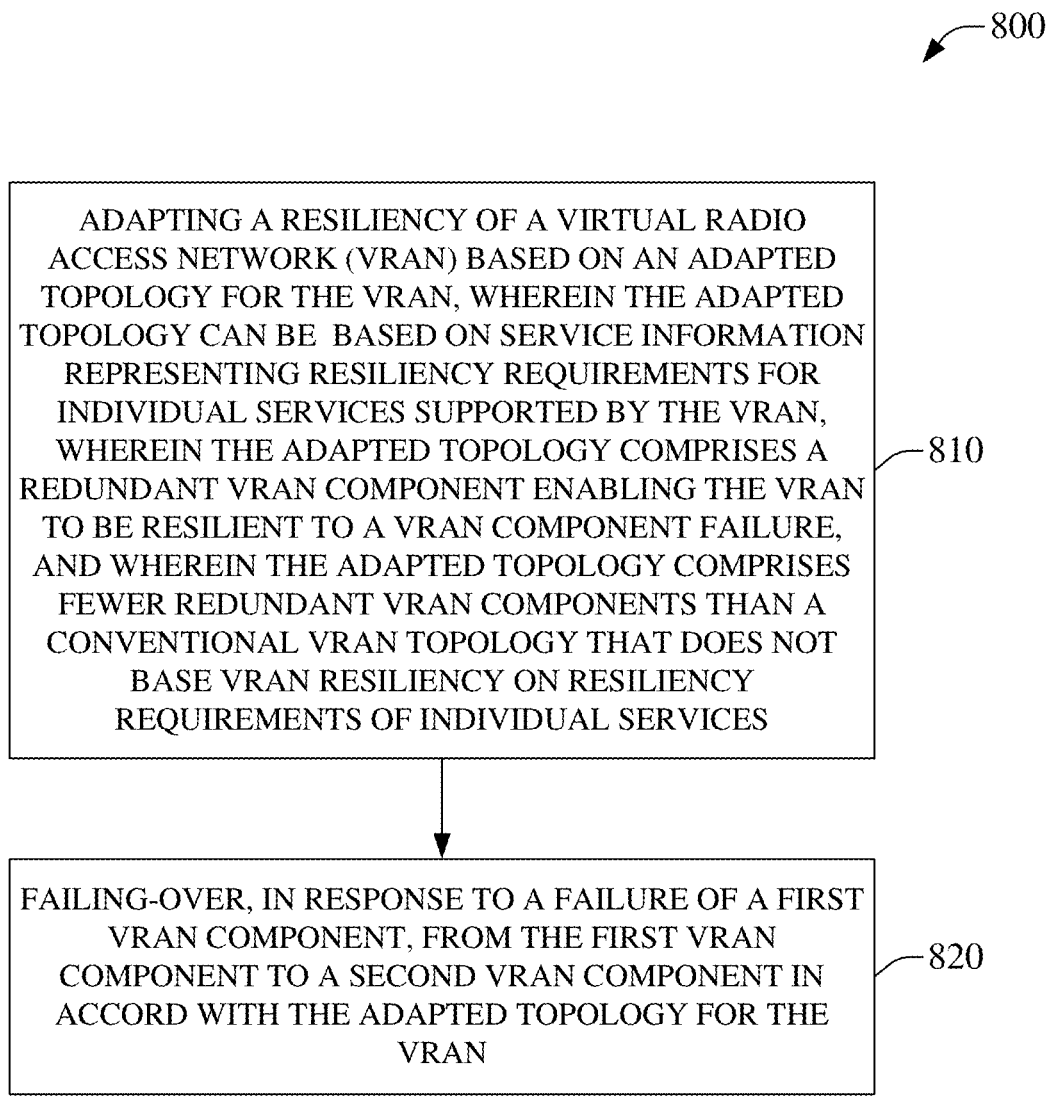
FIG. 8 illustrates an example method, facilitating a failover operation in an adaptable redundant virtualized radio access network, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of example method 600, which can facilitate adapting resiliency for a virtualized radio access network (vRAN), in accordance with aspects of the subject disclosure. System 600 can comprise receiving, at a resiliency management component (RMC), service information corresponding to a service supported by a virtual radio access network (vRAN). In an aspect, a virtual network function (VNF) can support a service(s) for a RAN and/or vRAN. In this regard, a same VNF can support same, similar, or even different services. As an example, an enhanced mobile broadband (eMBB) function(s) can support multiple mobile broadband services. In this example, the mobile broadband services can be distinct from each other and can similarly be affiliated with different reliability requirements, such as a first mobile broadband service having a higher reliability requirement than a second mobile broadband service. The example first mobile broadband service can correspond, for example, to a first responder entity that can require higher levels of reliability, e.g., via more extensive VRANC redundancy, than the example second mobile broadband service that can, for example, correspond to supporting a mobile device for a non-first responder entity.

In this example, even though the same vRAN function is employed, supporting services having different reliability requirements, e.g., at the granular service(s) level, can provide an avenue to conserve vRAN resources, e.g., operate at lower monetary and/or non-monetary costs. In this regard, where the example first and second mobile broadband services both employ the resiliency requirements of the second mobile broadband service, then the reliability requirement of the first mobile broadband service can be unmet. Moreover, where the example first and second mobile broadband service both employ the reliance requirements of the first mobile broadband service, then the second mobile broadband service requirements are met but with excessive VRANC redundancy, which can be understood to be wasteful of vRAN resources. As such, the RMC of 610 can enable adapting resiliency for a vRAN relative to the granularity of services supported by the vRAN. This can enable the vRAN topology, e.g., topology of vRAN physical and virtual components, to be adapted to the resiliency demands of a service supported by the vRAN, in contrast to conventional techniques that can be based on just a VNF, VNF execution location, etc.

In this regard, the example first mobile broadband service resiliency requirements and the second mobile broadband service resiliency requirements can be satisfied by determining a vRAN topology having VRANC redundancies tailored to each service resiliency requirement, e.g., the example first mobile broadband service resiliency requirement can result in a corresponding portion of the vRAN topology deploying more redundant VRANCs than would be indicated by the example second mobile broadband service resiliency requirement, while the example second mobile broadband service resiliency requirement can result in a corresponding portion of the vRAN topology deploying fewer redundant VRANCs than would be indicated by the example first mobile broadband service resiliency requirement. Accordingly, the service-based adapting resiliency for the vRAN can meet resiliency requirements of a supported service(s) without being as wasteful of resources as conventional techniques that do not consider service instance reliability requirements granularly in deployment of redundant VRANCs.

At 620, method 600 can comprise, determining a topology for the vRAN based on the service information, wherein the topology comprises a redundant vRAN component enabling the vRAN to be resilient to a vRAN component failure. Analysis of the service information can facilitate determining a vRAN topology(ies) that can consider service resiliency requirements granularly. The determined topology can result in adapting a previous vRAN topology to meet the resiliency requirements of each supported service of the vRAN, e.g., VRANCs can be added, removed, merged, split, updated, etc., to increase/decrease redundancy for each service supported by a vRAN to facilitate meeting the resiliency requirements of each service in a resource and/or cost-efficient manner. As an example, a first instance of a service can require two redundant VRANCs and a second instance of the service can require one redundant VRANC. In this example, the topology can provide three correspondingly redundant VRANCs, which can contrast with conventional techniques that would generally indicate four redundant components, e.g., where conventionally the highest resiliency reequipment is applied to all services of a function, VNF location, etc. The disclosed subject matter therefore provides for deployment of fewer VRANCs that conventional techniques, while still meeting the resiliency requirements of an individual service(s) in the determined topology.

Method 600, at 630, can comprise enabling access, via the RMC, to resiliency control information (RCI) corresponding to the topology, wherein the RCI can facilitate adapting a resiliency of the vRAN based on adapting the vRAN accord to the topology. Method 600 can end at this point. RCI can be based on the determined topology and can comprise instructions, commands, operations, values, etc., that can facilitate adapting a vRAN from a previous topology to a new topology in accord with the determined topology. RCI can be generated at the RMC. RCI can be communicated to a vRAN to enable the vRAN to implement adding, removing, merging, splitting, updating, etc., VRANCs such that the vRAN can adapt resiliency in accord with the determined topology to provide a supported service(s) with adequate resiliency at an individual service-level granularity.

FIG. 7 illustrates example method 700 that facilitates, via a resiliency rule, topology ranking, and topology selection, adapting resiliency for a virtualized radio access network (vRAN), in accordance with aspects of the subject disclosure. Method 700, at 710, can comprise receiving, at a resiliency management component (RMC), service information corresponding to a service supported by a virtual radio access network (vRAN). In an aspect, a virtual network function (VNF) can support a service(s) for a RAN and/or vRAN. In this regard, a same VNF can support same, similar, or even different services. Services can be distinct from each other and can similarly be affiliated with different reliability requirements. As such, an RMC can enable adapting resiliency for a vRAN relative to the granularity of services supported by a vRAN. This can enable the vRAN topology, e.g., topology of vRAN physical and virtual components, to be adapted to the resiliency demands of each supported vRAN service, in contrast to conventional techniques that can be based on just a VNF, component location, etc. In this regard, an example first mobile broadband service resiliency requirement and a second mobile broadband service resiliency requirement can be satisfied by determining a vRAN topology having VRANC redundancies corresponding to each service resiliency requirement, wherein the example first mobile broadband service resiliency requirement can result in deploying a different count of redundant VRANCs than would be indicated by the example second mobile broadband service resiliency requirement, while the example second mobile broadband service resiliency requirement can result in deploying a different count of redundant VRANCs than would be indicated by the example first mobile broadband service resiliency requirement. Accordingly, the service-based adapting of resiliency for the vRAN can meet resiliency requirements of a supported service(s) without being as wasteful of resources as conventional techniques that do not consider service instance reliability requirements granularly in deployment of redundant VRANCs.

At 720, method 700 can comprise determining a topology for the vRAN based on the service information, wherein the topology comprises a redundant vRAN component enabling the vRAN to be resilient to a vRAN component failure. Analysis of the service information, e.g., received at 710, can facilitate determining a vRAN topology(ies) that can reflect service resiliency requirements at a granular level. The determined topology can result in adapting a previous vRAN topology to meet a resiliency requirement of the individual services of the vRAN, e.g., VRANCs can be added, removed, merged, split, updated, etc., to increase/decrease redundancy for each service supported by a vRAN to facilitate meeting the resiliency requirements of each service in a resource and/or cost-efficient manner. The disclosed subject matter therefore provides for deployment of fewer VRANCs that conventional techniques, while still meeting the resiliency requirements of an individual service(s) in the determined topology.

Method 700, at 730, can comprise ranking the topology relative to other topologies, wherein the ranking is based on a rule related to a non-monetary cost of the topologies. Whereas several different topologies can satisfy one or more resiliency requirements for services of a vRAN, ranking these topologies can be useful in selecting a preferred topology of the topologies. In embodiments, ranking, ordering, sorting, filtering, etc., or combinations thereof, can be used to winnow topologies to a preferred topology without departing from the scope of the disclosed subject matter, e.g., filtering topologies can be used at 730 in lieu of, or in addition to, ranking topologies, as will be appreciated by one of skill in the relevant art, even where not further discussed for the sake of clarity and brevity. Accordingly, method 700, at 730, can result in an indication of more favored topologies, a preferred topology, etc.

At 740, method 700 can comprise selecting the topology based on the ranking of the topology and a selection rule related to a defined preemption criterion. As in 730, ranking, ordering, sorting, filtering, etc., or combinations thereof, can be used to select the topology, e.g., a ranked list of topologies can be filtered to remove incompatible topologies and thereby enable selection of a preferred compatible topology. In an example, of selecting the topology based on rank of the topology, a first and second topology can meet resiliency requirements of supported services but can comprise different distributions of VRANCs, such as the example first topology better balancing loading of servers at a first and second location in comparison to the example second topology that can more heavily load the first location and leave the second location less heavily loaded. In this example, a ranking of the first topology can be more favorable than the second topology based on the more balanced loading of physical processors performing the corresponding VNF operations. Accordingly, in this example, the first topology can be selected over the second topology.

At 740, method 700 can comprise enabling access, via the RMC, to resiliency control information (RCI) corresponding to the topology, wherein the RCI can facilitate adapting a resiliency of the vRAN based on adapting the vRAN accord to the topology. At this point, method 700 can end. RCI can be based on the selected topology and can comprise instructions, commands, operations, values, etc., that can facilitate adapting a vRAN from a previous topology to a new topology in accord with the selected topology. RCI can be generated at the RMC. RCI can be communicated to a vRAN to enable the vRAN to implement adding, removing, merging, splitting, updating, etc., VRANCs such that the vRAN can adapt resiliency in accord with the selected topology to provide a supported service(s) with adequate resiliency based on service-level granularity resiliency requirements.

FIG. 8 illustrates example method 800 facilitating a failover operation in an adaptable redundant virtualized radio access network (vRAN), in accordance with aspects of the subject disclosure. At 810, method 800 can comprise adapting a resiliency of a virtual radio access network (vRAN) based on an adapted topology for the vRAN, wherein the adapted topology can be based on service information representing resiliency requirements for individual services supported by the vRAN. The adapted topology can comprise a redundant vRAN component enabling the vRAN to be resilient to a vRAN component failure. The adapted topology can comprise fewer redundant vRAN components than a conventional vRAN topology that does not base vRAN resiliency on resiliency requirements of individual services of the vRAN.

In embodiments, resiliency control information (RCI) corresponding to a preferred topology can be employed in adapting resiliency of a vRAN by enabling adapting a topology of the vRAN to comprise and connect corresponding VRANCs and redundant VRANCs, as an example instantiating a local second VDUC and a non-local third VDUC that are redundant to a first VDUC, etc., corresponding to a new instance of a service instance added to the vRAN and having a corresponding resiliency requirement for one local and one remote redundancy. The RCI can facilitate adapting a resiliency of the vRAN based on adapting the vRAN accord to a preferred topology. RCI can be based on the preferred topology and can comprise instructions, commands, operations, values, etc., that can facilitate adapting a vRAN from a previous topology to a new topology in accord with the preferred topology. RCI generated at an RMC can enable a vRAN to implement adding, removing, merging, splitting, updating, etc., VRANCs such that the vRAN can adapt resiliency in accord with the preferred topology to provide a supported service(s) with adequate resiliency based on service-level granularity resiliency requirements. This can avoid the conventional techniques that can be wasteful of monetary and/or non-monetary costs by basing redundancy on a function, location, etc., that can result in all services of a function having resiliency corresponding to the most resilient service of the function, location, etc.

Method 800, at 820, can comprise failing-over, in response to a failure of a first vRAN component, from the first vRAN component to a second vRAN component in accord with the adapted topology for the vRAN. At this point, method 800 can end. An adapted vRAN topology can support failing over from a first VRANC to a second VRANC. In embodiments, the adapted vRAN topology, being based on analysis of a service(s) supported by the vRAN, can comprise the second VRANC according to a preferred topology, as disclosed elsewhere herein. As such, the failover from the first to the second VRANC can be in accord with a resiliency requirement of a service instance. In some circumstances, the resiliency requirement of a service instance can be inadequate for some network failures, in which circumstances, failover may not occur, and use of the service instance may be truncated. As an example, if a service requirement is to have one local redundant VRANC, and a vRAN suffers a regional outage, both the service and the redundant service can fail. However, this is not dispositive of the disclosed subject matter having satisfied the redundancy requirement of the example service, rather that the redundancy requirement of the example service was inadequate under the particular circumstances of this example. Generally, satisfying the service requirements of a service(s), while avoiding excessive topological redundancies from using a greatest redundancy requirement for all services of a function, location, etc., can be achieved in accord with the disclosed subject matter and can enable corresponding failovers. In some embodiments, it can be preferable to allow a service to fail above a threshold level of network failure precisely because the 'costs' of an otherwise extremely resilient network are greater than the benefits of the otherwise extremely resilient network. As an example, the 'costs' to deploy a single redundant VRANC can be acceptable for a first service instance while costs to deploy triply redundant VRANCs are acceptable for a second service instance. In this example, a sufficient network outage can comprise the first and second services and also one of each redundant VRANCs, whereby the first service fails and the second service can failover to another of the triply redundant VRANCs. In this example, it can be acceptable that the first service instance fails because the cost of additional redundancy for the first service instance was determined to be not acceptable. However, the second service instance in this example can remain functional via the other redundant vRAN components because the cost of triple redundancy was determined to be acceptable. As such, the disclosed subject matter can facilitate efficiently adapting resiliency of a vRAN by enabling resiliency requirements of individual service instances to be considered in determining and/or implementing a topology for a vRAN.

Figure 9:
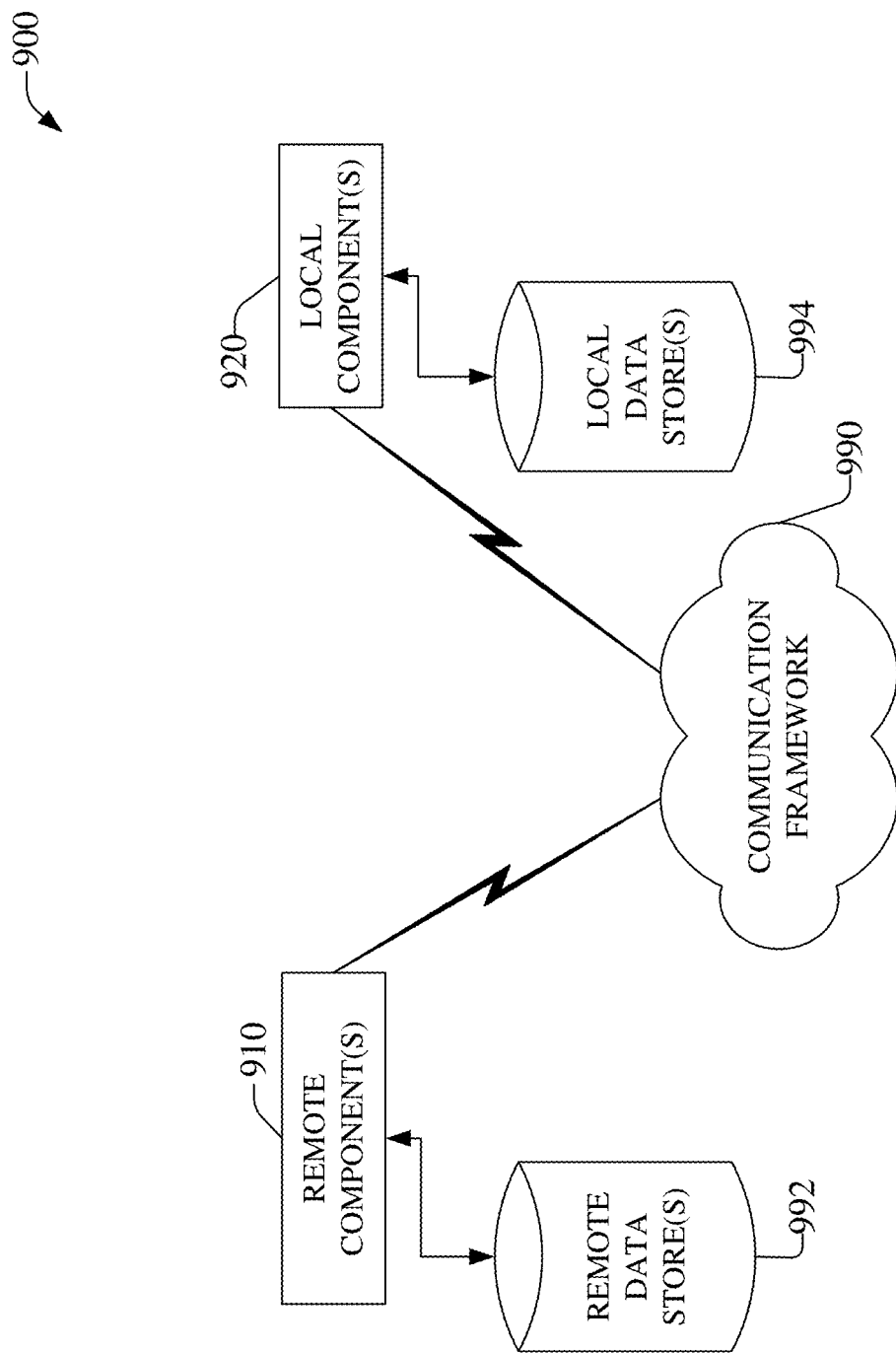
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise RMC 110-510, etc., VRANC 120-122, VDUC 2220-2222, 3220-3235, 4220-4224, etc., CLOUD 3901-3904, 4901-4903, etc., VCUC 224, etc., VCU-CP 3250-3253, 4250-4253, etc., VCU-UP 3260-3264, 4260-4264, etc., RUC 130-132, 230-232, 330-334, 430-436, etc., UE 1011-1012, 2011-2012, etc., SMO 204, 304, 404, etc., or any other component that is located remotely from another component of systems 100-500, etc.

The system 900 also comprises one or more local component(s) 920. The local component(s) 920 can be hardware and/or software (e.g., threads, processes, computing devices). In some embodiments, local component(s) 920 can comprise RMC 110-510, etc., VRANC 120-122, VDUC 2220-2222, 3220-3235, 4220-4224, etc., CLOUD 3901-3904, 4901-4903, etc., VCUC 224, etc., VCU-CP 3250-3253, 4250-4253, etc., VCU-UP 3260-3264, 4260-4264, etc., RUC 130-132, 230-232, 330-334, 430-436, etc., UE 1011-1012, 2011-2012, etc., SMO 204, 304, 404, etc., or any other component that is located local to another component of systems 100-500, etc. As one of many possible examples, an RMC can be comprised in a SMO connected, via a communication framework to one or more remotely located VCUCs, e.g., VDUCs, VCU-CPs, VCU-UPs, etc., wherein the RMC can determine adapting resiliency of a vRAN comprising the one or more remotely located VCUCs supporting communication between a UE and a service component supporting a service(s).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 990 that can comprise path segments, path parts, etc., that can be employed to facilitate communications between the remote component(s) 910 and the local component(s) 920, and can comprise a fiber segment, metal segment, e.g., copper segment, etc., an air interface segment, e.g., Uu interface of a UMTS network, via a long-term evolution (LTE) network, 5G, 6G, and/or another path segment. Remote component(s) 910 can be operably connected to one or more remote data store(s) 992, such as a hard drive, solid state drive, SIM card, eSIM, device memory, etc., that can be employed to store information on the remote component(s) 910 side of communication framework 990. Similarly, local component(s) 920 can be operably connected to one or more local data store(s) 994, that can be employed to store information on the local component(s) 920 side of communication framework 990. As examples, traffic 102-602, information related to configuring a cellular frontend, information related to configuring a steerable fiber backend, etc., can be communicated between components of systems 100-600 via a communication framework, e.g., communication framework 692, 990, etc.

Figure 10:
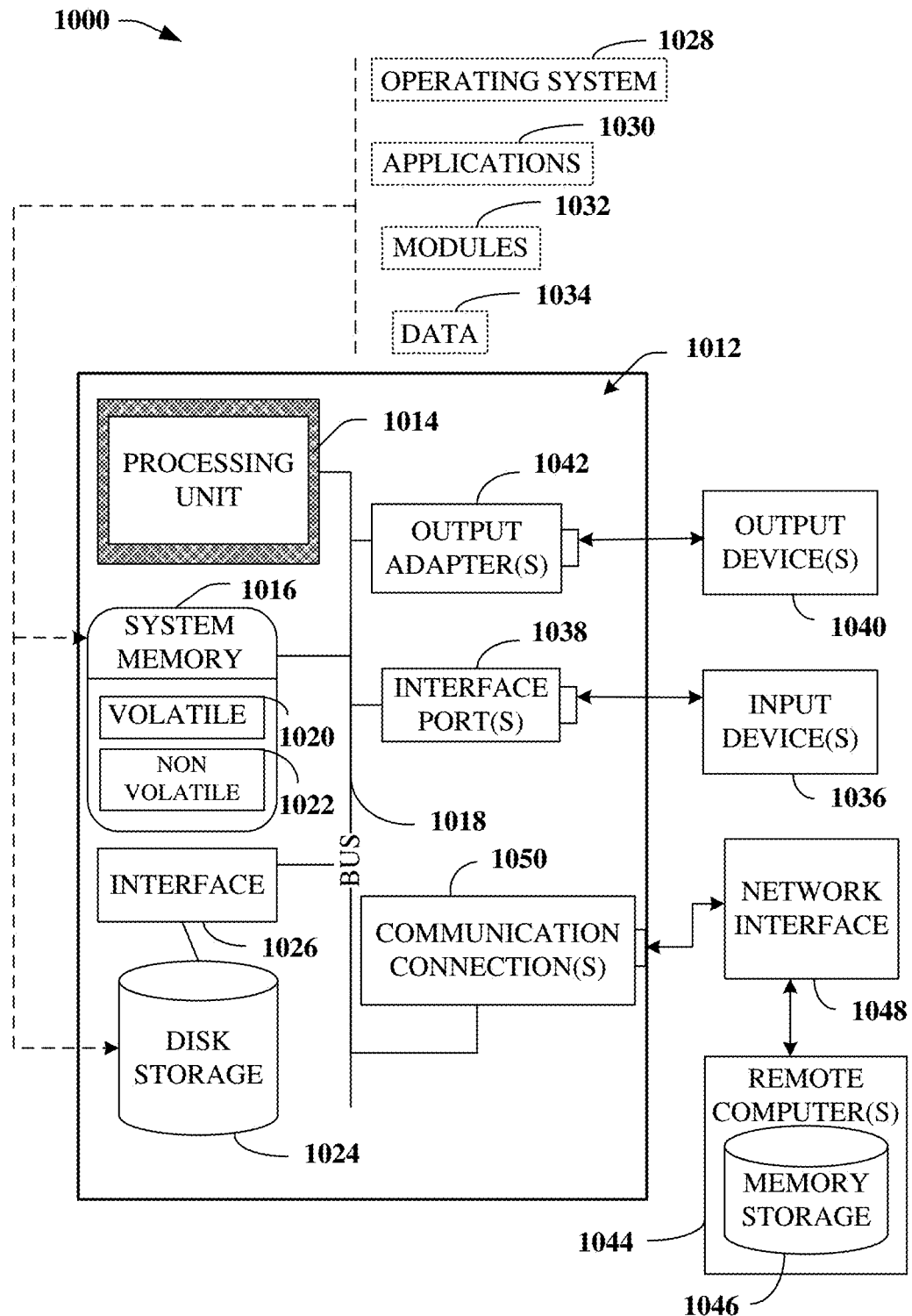
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random-access memory, synchronous dynamic random-access memory, double data rate synchronous dynamic random-access memory, enhanced synchronous dynamic random-access memory, SynchLink dynamic random-access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can, for example, comprised RMC 110-510, etc., VRANC 120-122, VDUC 2220-2222, 3220-3235, 4220-4224, etc., CLOUD 3901-3904, 4901-4903, etc., VCUC 224, etc., VCU-CP 3250-3253, 4250-4253, etc., VCU-UP 3260-3264, 4260-4264, etc., RUC 130-132, 230-232, 330-334, 430-436, etc., UE 1011-1012, 2011-2012, etc., SMO 204, 304, 404, etc., or any other component of systems 100-500, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random-access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory, or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory, or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries, or other data retrieval protocols, for a variety of operations with respect to the information stored by the medium. As such, for example, a computer-readable medium can comprise executable instructions stored thereon that, in response to execution, can cause a system comprising a processor to perform operations comprising generating an updated topology for the virtual radio access network in response to receiving service information corresponding to a service instance supported by a topology of the virtual radio access network. The updated topology can comprise a first virtual radio access network component and a second virtual radio access network component that is redundant to the first virtual radio access network and supports failover of the first virtual radio access network to the second virtual radio access network. The operations can further comprise facilitating adapting a resiliency of the virtual radio access network via updating the topology to a new topology based on resiliency control information corresponding to the updated topology.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line-controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring, and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), fifth generation partnership project (5G or 5GPP); sixth generation partnership project (6G or 6GPP), next generation (NG) radio, LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to authenticating a user-identity to a user-account. Authentication can, in some embodiments, refer to determining whether a user-identity requesting a service from a telecom network is authorized to do so within the network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); sixth generation partnership project (6G or 6GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength (X) for millimeter waves is typically in the 1-mm to 10-mm range.

The term "infer", or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices, and drawings such terms are intended to be inclusive in a manner similar to the term "comprising" as "comprising" is interpreted when employed as a transitional word in a claim.

What is claimed is:

1. A device, comprising:
   a processor; and
   a memory that stores executable instructions that, when executed by the processor, facilitate performance of operations, comprising:
      receiving service information corresponding to a service instance supported by a virtual radio access network;
      determining a topology for the virtual radio access network based on the service information, wherein the topology comprises a first virtual radio access network component and a second virtual radio access network component that is redundant to the first virtual radio access network component to support failover of the first virtual radio access network to the second virtual radio access network; and
      enabling access to resiliency control information corresponding to the topology determined for the virtual radio access network, wherein the resiliency control information facilitates adapting a resiliency of the virtual radio access network via implementing the topology determined for the virtual radio access network based on the resiliency control information.

2. The device of claim 1, wherein the first virtual radio access network component is part of a distributed unit specified according to a virtual radio access network architecture.

3. The device of claim 1, wherein the first virtual radio access network component is part of a central unit specified according to a virtual radio access network architecture.

4. The device of claim 3, wherein the central unit is a control plane central unit.

5. The device of claim 3, wherein the central unit is a user plane central unit.

6. The device of claim 1, wherein the resiliency control information facilitates the adapting of the virtual radio access network from a previous topology to the topology determined for the virtual radio access network.

7. The device of claim 6, wherein the adapting results in adding a virtual radio access network component to the virtual access network based on resiliency information that corresponds to the service instance and that is comprised in the service information.

8. The device of claim 6, wherein the adapting results in removing a virtual radio access network component from the virtual access network based on resiliency information that corresponds to the service instance and that is comprised in the service information.

9. The device of claim 1, wherein the first virtual radio access network component is local to the second virtual radio access network component.

10. The device of claim 1, wherein the first virtual radio access network component is located remote from the second virtual radio access network component.

11. The device of claim 1, wherein the topology is ranked relative to other topologies other than the topology based on a determined ranking criterion.

12. The device of claim 11, wherein the topology is selected for implementation based on the rank of the topology relative to other ranks of the other topologies.

13. The device of claim 11, wherein ranking of the topology and the other topologies results in ranked topologies comprising the rank of the topology and other ranks of the other topologies, and wherein the topology is selected for implementation based on the rank of the topology subsequent to filtering the ranked topologies based on a preclusion criterion applicable to filter at least one of the ranked topologies other than the topology.

14. A method, comprising:
   determining, by a system comprising a processor, an updated topology for a virtual radio access network that is to be used for an update of a current topology for the virtual radio access network based on service information, wherein the service information corresponds to a service instance supported by the current topology of the virtual radio access network, wherein the updated topology comprises a first virtual radio access network function and a second virtual radio access network function that is redundant to the first virtual radio access network function and supports failover of the first virtual radio access network to the second virtual radio access network; and
   initiating, by the system, adapting a resiliency of the virtual radio access network via updating the current topology to a different topology other than the topology based on resiliency control information corresponding to the updated topology.

15. The method of claim 14, wherein determining the updated topology based on the service information that corresponds to the service instance results in the updated topology comprising fewer virtual radio access network functions than where the updated topology is not based on the service information that corresponds to a service instance.

16. The method of claim 15, wherein updating the current topology to the different topology, according to the updated topology based on the service information that corresponds to the service instance, causes the different topology to comprise fewer virtual radio access network functions than where the updating to the different topology is based on another updated topology, other than the updated topology, that is not based on the service information that corresponds to the service instance, and wherein the different topology comprising fewer virtual radio access network functions results in a lower monetary cost to maintain the virtual radio access network than where the different topology comprises more virtual radio access network functions than a number of network functions of the fewer virtual radio access network functions.

17. The method of claim 15, wherein updating the current topology to the different topology, according to the updated topology based on the service information that corresponds to the a service instance, causes the different topology to comprise fewer virtual radio access network functions than where the updating to the different topology is based on another updated topology, other than the updated topology, that is not based on the service information that corresponds to the service instance, and wherein the different topology comprising fewer virtual radio access network functions results in a lower non-monetary cost to maintain the virtual radio access network than where the new topology comprises more virtual radio access network functions than a number of network functions of the fewer virtual radio access network functions.

18. A non-transitory machine-readable storage medium, comprising executable instructions that, when executed by a processor, facilitate performance of operations, comprising:
   in response to receiving service information corresponding to a service instance supported by a topology of the virtual radio access network, generating an updated topology for the virtual radio access network, applicable to update the topology, based on the service information, wherein the updated topology comprises a first virtual radio access network device and a second virtual radio access network device that is redundant to the first virtual radio access network device and supports failover of the first virtual radio access network to the second virtual radio access network; and
   enabling an adaptation of a resiliency of the virtual radio access network via updating the topology to a different topology other than the topology based on resiliency control information corresponding to the updated topology.

19. The non-transitory machine-readable storage medium of claim 18, wherein the first virtual radio access network device is a distributed unit of a virtual radio access network architecture.

20. The non-transitory machine-readable storage medium of claim 18, wherein the first virtual radio access network device is a central unit of a virtual radio access network architecture.

* * * * *